(12) United States Patent
Denton et al.

(10) Patent No.: US 11,078,051 B2
(45) Date of Patent: Aug. 3, 2021

(54) SEAL FOR A VACUUM MATERIAL LIFTER

(71) Applicant: Vacuworx Global LLC, Tulsa, OK (US)

(72) Inventors: Robert Denton, Tulsa, OK (US); James Ray Podesta, Tulsa, OK (US); William J. Solomon, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 153 days.

(21) Appl. No.: 16/538,230

(22) Filed: Aug. 12, 2019

(65) Prior Publication Data

US 2019/0360592 A1 Nov. 28, 2019

Related U.S. Application Data

(63) Continuation of application No. 15/820,890, filed on Nov. 22, 2017, now Pat. No. 10,378,652, which is a (Continued)

(51) Int. Cl.
| | |
|---|---|
| *B66C 1/02* | (2006.01) |
| *F16J 15/10* | (2006.01) |
| *F16J 15/02* | (2006.01) |
| B29K 105/04 | (2006.01) |
| B29K 21/00 | (2006.01) |

(Continued)

(52) U.S. Cl.
CPC .......... *B66C 1/0231* (2013.01); *B66C 1/0281* (2013.01); *F16J 15/022* (2013.01); *F16J 15/10* (2013.01); *F16J 15/104* (2013.01); *B29C 44/26* (2013.01); *B29C 44/3484* (2013.01); *B29C 44/50* (2013.01); *B29C 44/5627* (2013.01); *B29C 48/0012* (2019.02); *B29C 48/022* (2019.02); *B29C 48/03* (2019.02); *B29C 48/91* (2019.02); *B29C 69/001* (2013.01); *B29D 99/0053* (2013.01); *B29D 99/0085* (2013.01); *B29K 2007/00* (2013.01); *B29K 2011/00* (2013.01); *B29K 2021/006* (2013.01); *B29K 2023/16* (2013.01); *B29K 2105/043* (2013.01); *B29K 2105/046* (2013.01); *B29K 2105/24* (2013.01); *B29K 2995/0069* (2013.01); *B29L 2031/26* (2013.01); *B29L 2031/762* (2013.01)

(58) Field of Classification Search
CPC ....... B66C 1/02; B66C 1/0212; B66C 1/0231; B66C 1/0281; B66C 1/0287; B66F 9/181; B25J 15/0683; F16J 15/022; F16J 15/102
USPC .......................................................... 294/189
See application file for complete search history.

(56) References Cited

U.S. PATENT DOCUMENTS

| | | |
|---|---|---|
| 3,117,815 A | 1/1964 | Creskoff |
| 3,227,482 A | 1/1966 | Harris et al. |

(Continued)

FOREIGN PATENT DOCUMENTS

| | | |
|---|---|---|
| CN | 103087361 A | 5/2013 |
| DE | 102012010047 A1 | 11/2013 |

(Continued)

*Primary Examiner* — Nicholas L Foster
(74) *Attorney, Agent, or Firm* — GableGotwals

(57) ABSTRACT

A seal for a vacuum lifter and method of manufacture wherein the seal has a continuous unbroken outer fluid resistant skin of elastomer which forms a boundary around a homogeneous cellular structure with no interior seams or joints.

19 Claims, 4 Drawing Sheets

Related U.S. Application Data continuation-in-part of application No. 14/829,827, filed on Aug. 19, 2015, now Pat. No. 9,885,419.

(60) Provisional application No. 62/039,665, filed on Aug. 20, 2014.

(51) Int. Cl.

| | |
|---|---|
| B29D 99/00 | (2010.01) |
| B29L 31/26 | (2006.01) |
| B29K 7/00 | (2006.01) |
| B29C 44/34 | (2006.01) |
| B29L 31/00 | (2006.01) |
| B29K 23/00 | (2006.01) |
| B29C 44/26 | (2006.01) |
| B29C 44/50 | (2006.01) |
| B29C 44/56 | (2006.01) |
| B29K 105/24 | (2006.01) |
| B29C 69/00 | (2006.01) |
| B29C 48/00 | (2019.01) |
| B29C 48/03 | (2019.01) |
| B29C 48/91 | (2019.01) |

(56) References Cited

U.S. PATENT DOCUMENTS

| | | | |
|---|---|---|---|
| 3,511,685 A | | 5/1970 | Rentschler |
| 3,640,562 A | * | 2/1972 | Creskoff ............... B66C 1/0281 294/65 |
| 3,833,251 A | * | 9/1974 | Creskoff ............... B66F 9/181 294/189 |
| 4,166,648 A | * | 9/1979 | Creskoff ............... B66C 1/0231 294/189 |
| 4,314,219 A | | 2/1982 | Haraguchi |
| 4,529,353 A | | 7/1985 | Dean et al. |
| 4,946,335 A | | 8/1990 | King et al. |
| 5,013,075 A | | 5/1991 | Littell |
| 5,301,958 A | | 4/1994 | Covington |
| 5,382,935 A | | 1/1995 | Doyelle |
| 5,752,729 A | | 5/1998 | Crozier et al. |
| 6,002,317 A | | 12/1999 | Pignataro |
| 6,075,205 A | * | 6/2000 | Zhang ............... H05K 9/0015 174/358 |
| 6,076,873 A | | 6/2000 | Jung |
| 6,104,270 A | | 8/2000 | Elias |
| 6,557,429 B1 | | 5/2003 | Asquith |
| 6,561,522 B1 | | 5/2003 | Radelet et al. |
| D490,201 S | | 5/2004 | Liao |
| 6,854,777 B2 | | 2/2005 | Jung |
| D536,152 S | | 1/2007 | Yamaki |
| D547,461 S | | 7/2007 | Kemnitzer et al. |
| D609,823 S | | 2/2010 | Holman |
| D619,737 S | | 7/2010 | Shoaf et al. |
| 8,268,032 B2 | | 9/2012 | Eyers et al. |
| 8,683,676 B1 | | 4/2014 | Wuester, Sr. et al. |
| 9,446,933 B1 | * | 9/2016 | Solomon ............... B66C 23/18 |
| 9,896,892 B2 | * | 2/2018 | Solomon ............... B66C 1/02 |
| 9,932,207 B2 | * | 4/2018 | Solomon ............... E01F 15/006 |
| 10,227,835 B1 | * | 3/2019 | Solomon ............... B25J 15/0625 |
| 10,336,583 B2 | * | 7/2019 | Solomon ............... E01F 15/006 |
| 10,731,427 B2 | * | 8/2020 | Solomon ............... E21B 19/155 |
| 2008/0001418 A1 | | 1/2008 | Pancheri |
| 2009/0033111 A1 | | 2/2009 | Hupp |
| 2009/0206558 A1 | | 8/2009 | Nameki |
| 2009/0233052 A1 | | 9/2009 | Thuot et al. |
| 2010/0001477 A1 | | 1/2010 | Eyers et al. |
| 2010/0183415 A1 | | 7/2010 | Solomon et al. |
| 2014/0035304 A1 | | 2/2014 | Seebauer |
| 2014/0054911 A1 | * | 2/2014 | Solomon ............... B66C 1/0262 294/183 |
| 2016/0025226 A1 | | 1/2016 | Tanabe et al. |
| 2016/0053893 A1 | | 2/2016 | Denton et al. |

FOREIGN PATENT DOCUMENTS

| | | |
|---|---|---|
| EP | 0576137 A1 | 12/1993 |
| GB | 1036586 | 7/1966 |
| JP | 2005014924 A | 2/2005 |
| JP | 2005041924 A | 2/2005 |

* cited by examiner

SEAL FOR A VACUUM MATERIAL LIFTER

CROSS-REFERENCE TO RELATED APPLICATIONS

The present application is a Continuation application which claims priority to U.S. patent application Ser. No. 15/820,890, filed on Nov. 22, 2017, which was a continuation-in-part of U.S. patent application Ser. No. 14/829,827, filed on Aug. 19, 2015, U.S. Pat. No. 9,885,419, which claimed priority to U.S. Provisional Application No. 62/039,665, filed on Aug. 20, 2014, which are incorporated herein by reference.

FIELD OF THE INVENTION

The present invention relates generally to an improved seal for a vacuum material lifter. More particularly, the present invention relates to a seal for a vacuum material lifter that does not delaminate, has improved compression set resistance, tear strength & environmental resistance and is resistant to absorption of liquids.

BACKGROUND OF THE INVENTION

Vacuum material lifters are typically attached to the end of the boom of an excavator, backhoe or other piece of large construction equipment. They are used to move large objects such as pipe, plate steel, traffic barriers and other large heavy objects that, in general, have a smooth, continuous and nonporous surface. These objects may weigh in a range of 0.1 metric tons to 0.8 metric tons (about 220 lbs to about 1,700 lbs) on up to 2 metric tons (about 4,400 lbs), 2 metric tons to 25 metric tons (about 4,400 lbs to about 55,100 lbs) or even up to 40 metric tons (about 88,100 lbs). The seal is fixed to the pad, as illustrated in FIGS. 1 through 4, and the lifter is configured to create a void space between the inner perimeter of the seal and the pad when the lifter is placed over the object to be lifted.

The operator of the equipment lowers the vacuum lifter until the seal on the outer perimeter of the pad comes into contact with the surface of the object to be lifted. Once the entire seal is in contact with the surface of the object, the operator opens a valve which creates a vacuum between the pad and the surface of the object. Once a sufficient vacuum pressure has been achieved, the operator can then lift the object using the boom of the excavator or other heavy equipment. The forces produced by the vacuum within the void space exert a compressive force on the seal which is relieved once the vacuum is released. The seal must have density memory to undergo many such compression/relaxation cycles without rupturing or exhibiting excessive permanent compression set in order to function optimally. The seal also must not exhibit a significant loss of stiffness during service otherwise the pad on the lifter might bottom out on the surface of the object to be lifted; thereby, preventing the development of an effective vacuum seal. It is obvious that maintaining an effective vacuum seal is critical to the function of the vacuum material lifter.

Seals for these vacuum lifters have typically been fabricated out of sheets of polyisoprene sponge or cellular rubber. These sheets come in various thicknesses and typically seals are comprised of two (2) plied thicknesses, each approximately 1 inch thick. Typical seals are fabricated into a 2" wide×2" thick cross-section, so in order to get the 2-inch-thick seals needed for the vacuum lifters, it is necessary to laminate two layers of polyisoprene sponge rubber together. The lamination process typically involves the use of pressure sensitive adhesives, sometimes used with a binding layer of tape. Seals are typically fabricated such that the two (2) surfaces with exposed open cells are laminated together. The open cell surfaces are laminated together since the open cell surface provides the maximum amount of surface area for bonding. By laminating the open cell surfaces, the typical 2" wide×2" thick fabricated cellular seal will have two (2) surfaces with exposed open cells and two (2) surfaces with a rubber skin and no open exposed cells. The lamination process must be very well controlled in order to achieve adequate bond strength between the two plied layers. If the bond strength is less than the peel strength of the sponge rubber, the seal can delaminate or rupture in service which can result in the seal pulling out of the retention gland of the pad or loss of vacuum during lifting, causing the object to be suddenly released; thereby creating a potential safety issue. Seals are installed into the gland, as illustrated in FIG. 3, on the lower surface of the pad such that the laminated seam is aligned in the vertical direction to minimize the stresses at the laminated joint. Orienting the laminated seal in this manner causes the sides of the seal with the rubber skin to be on the vertical edges of the cross-section while the exposed cells are on the horizontal surfaces. This results in the seal having exposed cells on the surface that comes in contact with the object to be lifted. This causes the exposed cells to be susceptible to rapid abrasion and wear. The exposed cells will also quickly absorb liquids that can be on the surface of the object to be lifted.

One of the shortcomings of the prior art seals is that over time and particularly when seals are exposed to the elements, including elevated ambient temperatures and atmospheric ozone, the two bonded layers of sponge rubber may delaminate from one another causing the seal to fail. This occurs as the polyisoprene rubber and/or the bonding adhesive deteriorates causing the two layers to delaminate when subjected to compression loading cycles as the vacuum lifter operates. At that point, the seal, or at least that portion of the seal with the delamination, must be replaced. This adds to the downtime and the overall maintenance cost of the equipment.

Further, the prior art seals are susceptible to contamination by gas, diesel fuel, hydraulic fuel and other petrochemicals commonly found on a construction site. These chemicals contribute to the deterioration of the polyisoprene rubber. This problem is compounded by the fact the seal does not have a continuous surface since the top and bottom surfaces of the seals have exposed cells. The exposed open cells of the laminated polyisoprene rubber seal may come into contact with a puddle of one of these chemicals, which can quickly be absorbed into the cells of the polyisoprene rubber causing rapid deterioration of the polyisoprene rubber. Once a seal has absorbed one of these chemicals into the cellular structure, it is impossible to remove all of the chemical or stop the deterioration of the seal.

What is needed, therefore, is a seal for a vacuum lifter that does not rely on a laminated seam. Further, what is needed, is a seal that resists absorption of liquids and provides greater resistance to environmental degradation with high abrasion resistance and improved resistance to permanent compression set.

BRIEF SUMMARY OF THE INVENTION

The present invention is a seal without an adhesive lamination and with a monolithic body and a continuous unbroken outer skin. This eliminates problems associated with delamination of the seal. It also limits the absorption of liquids that can cause deterioration of the interior of the seal since no open cells are exposed.

The method for manufacturing includes the steps of mixing a batch of a thermoset elastomer, extruding the elastomer through a die, placing the extrusion into a closed mold, curing the extrusion in the mold, heating the extrusion and mold, removing the extrusion from the mold and inserting the seal in the gland of a vacuum pad on a vacuum lifter.

The seal produced following the disclosed manufacturing method eliminates the need for lamination of thin sections since the seal cross-section is one homogeneous structure with a continuous unbroken outer skin of cured elastomer. This eliminates a bonded seam in the seal and eliminates the possibility of any type of delamination failure of the seal while in service.

In embodiments, the seal includes a monolithic body comprising a core structure surrounded by an integral and continuous nonporous external skin. The monolithic body may be a cured extruded natural rubber closed cell thermoset elastomer. The body has no open cells and is not laminated. The core structure and the external skin are both liquid and petrochemical resistant such that even if the skin is ruptured, the closed cell structure of the core structure provides resistance to saturation by a liquid. The seal also has a memory effect such that it is resistant to permanent compression set.

The seal may be formed by the process of curing an extruded natural rubber closed cell thermoset elastomer segment in a heated closed mold to form the external skin surrounding the core structure. After the process of curing, the monolithic body is in the shape of a linear, longitudinally extending segment that may be cut to length. One end of the segment may then be bonded to another opposite end of the segment to form a seal having a closed periphery which can then be received in a gland of a vacuum lifter pad.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

In embodiments, a seal of this disclosure includes a linear, longitudinally extending monolithic body having no open cells, a density memory, and a liquid- and petrochemical resistant core structure continuous external surface. The monolithic body may be formed by the process of curing an extruded natural rubber closed cell thermoset elastomer when in a heated closed mold, After the process of curing, the monolithic body may be cut to length to be received in a gland located about a periphery of the vacuum lifter vacuum pad. One end of the monolithic body may be bonded to an adjacent opposing end of the cut monolithic body.

In other embodiments, the seal includes a linear, longitudinally extending monolithic body made of an extruded natural rubber closed cell thermoset elastomer. The monolithic body has a density memory, no open cells, and a liquid- and petrochemical-resistant core structure and a liquid- and petrochemical-resistant continuous external surface surrounding the core structure. The monolithic body is formed by the process of curing the elastomer in a heated closed mold, wherein the monolithic body is cut to length after the elastomer is cured.

Figure 1:
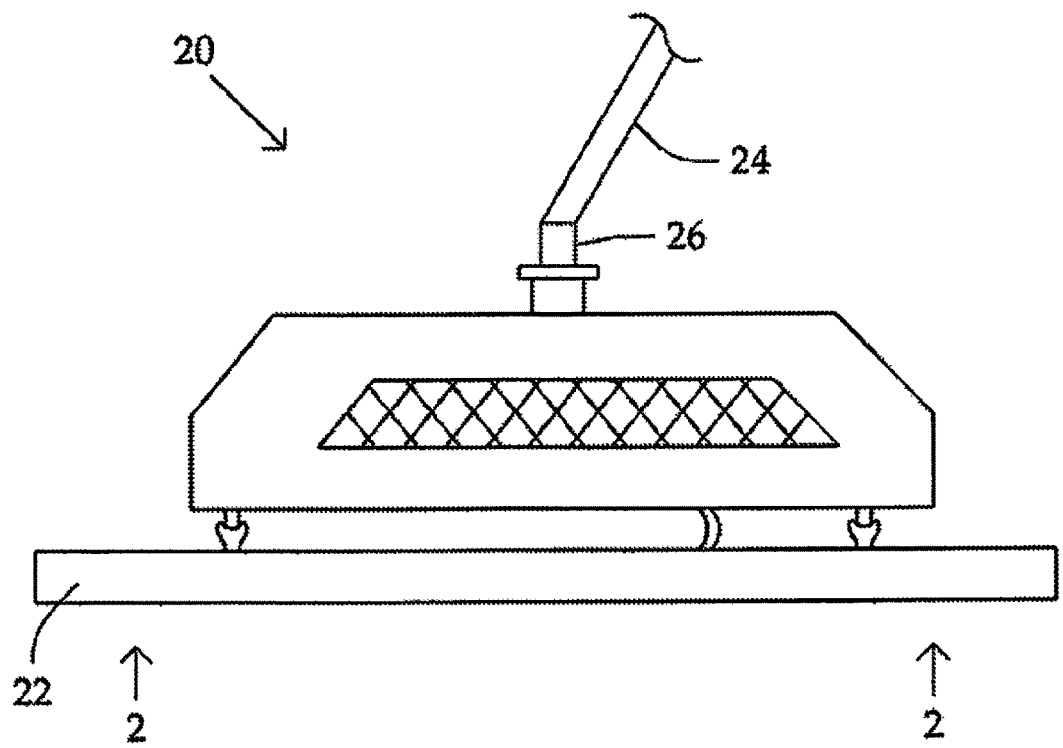
FIG. 1 is a side view of a vacuum lifter with a pad and seal.
Figure 2:
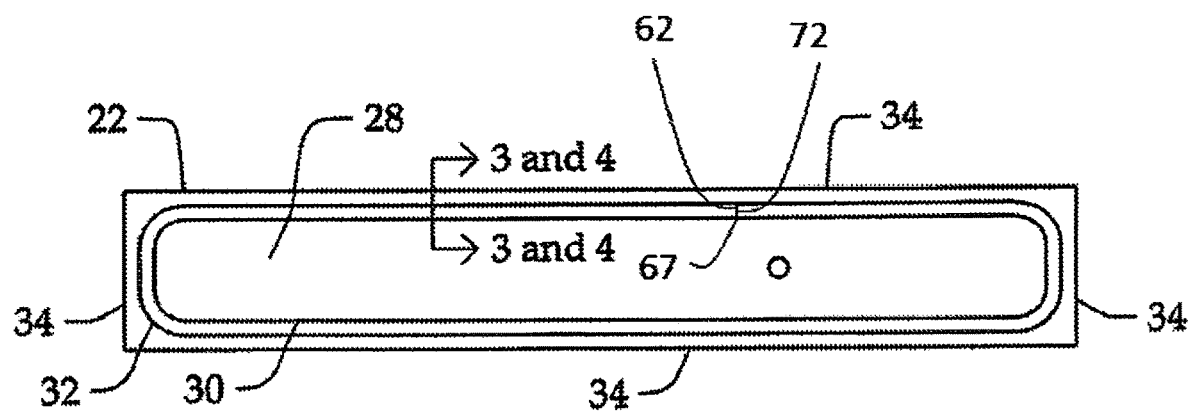
FIG. 2 is a bottom view of a vacuum lifter pad with a seal.

Turning now to the drawings wherein like reference characters indicate like or similar parts throughout, FIG. 1 illustrates a vacuum lifter 20 with its vacuum pad 22 attached to a boom 24 via a rotator 26. FIG. 2 shows the bottom surface 28 where a seal 30 is captured in a gland 32 which extends along the periphery 34 of the pad 22.

Figure 3:
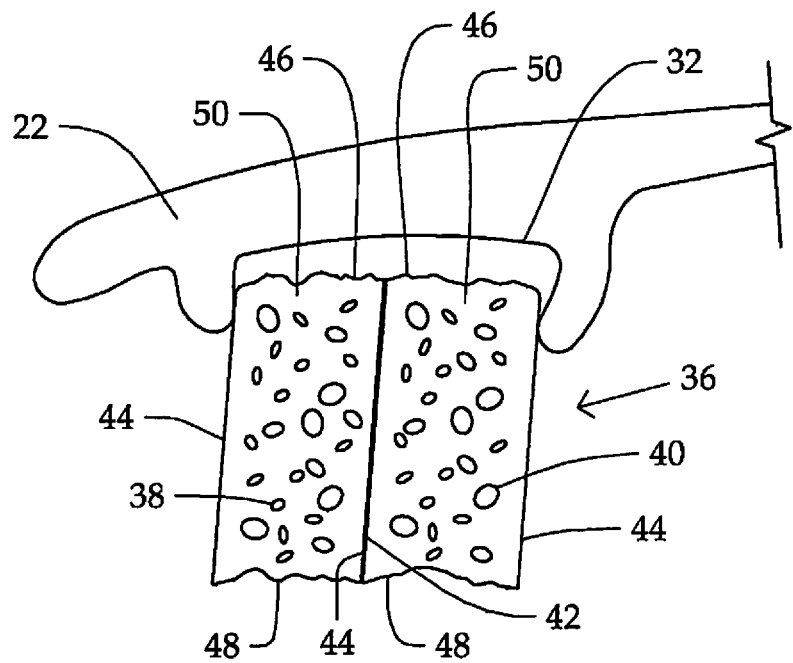
FIG. 3 is a cross-sectional view of the prior art seal for a vacuum lifter pad.

FIG. 3 shows a cross section of the pad 22 with a prior art seal 36 located in the gland 32. The seal 36 has a first and second layer 38 and 40 polyisoprene rubber secured together by an adhesive lamination 42. The seal 36 is oriented in the gland 32 such that the skin 44 of these layers 38 and 40 extend downward from the gland 32 and bottom surface 34 of the pad 22. This leaves the top and bottom surfaces 46 and 48 of the prior art seal 36 with exposed open cell structure 50. As explained earlier, this leads to the deterioration of the prior art seal 36.

Figure 4:
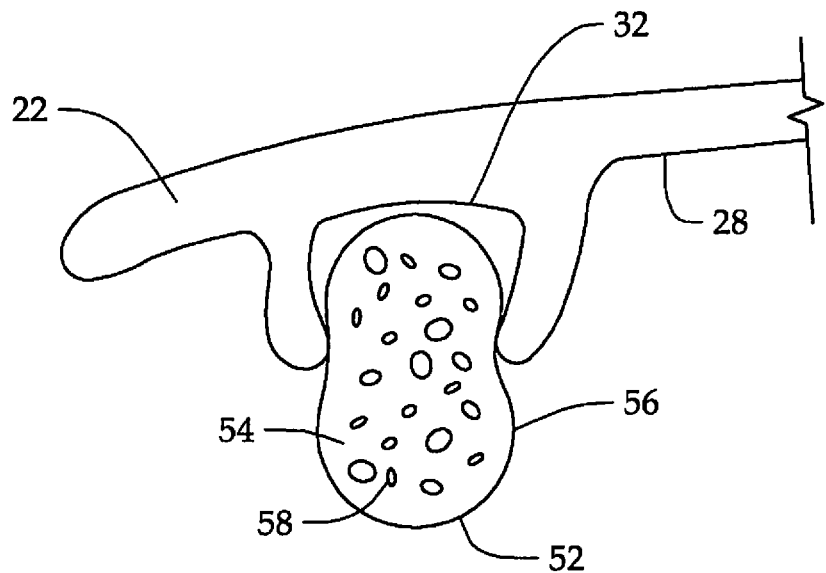
FIG. 4 is a cross-sectional view of the improved seal of the present invention.
Figure 5:
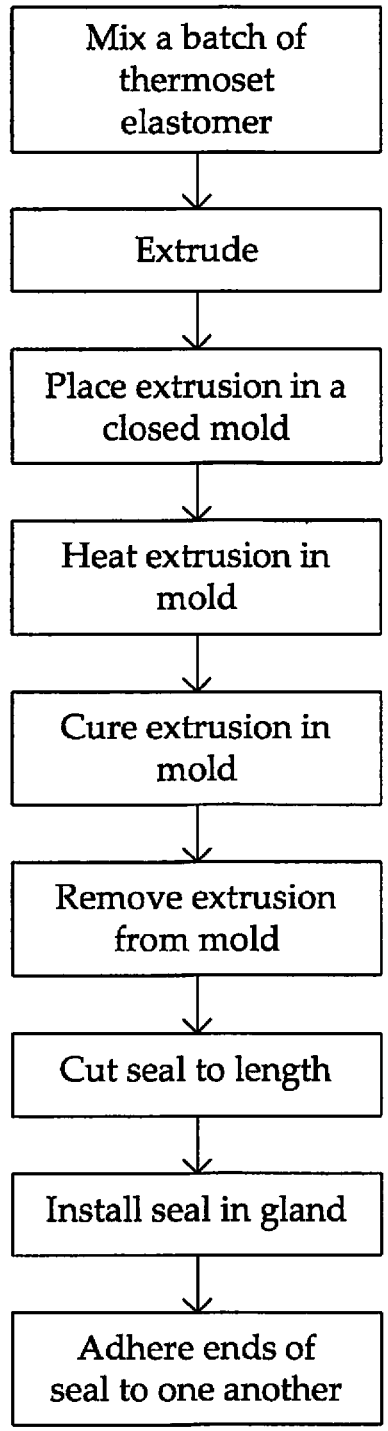
FIG. 5 is a flow chart of the process for manufacturing the present invention.
Figure 6:
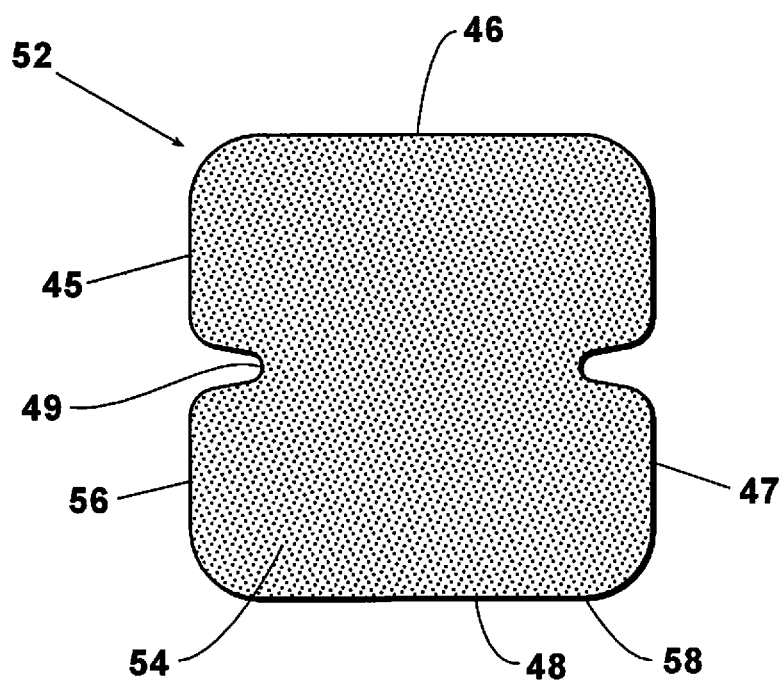
FIG. 6 a cross section view of an embodiment of the seal having an indentation, recess, or valley located at a midpoint of two opposing sides of the seal.

FIG. 4 shows a cross section of the seal 52 of the present invention located in the gland 32 of the vacuum pad 22. It has a closed cell structure 54 surrounded by a continuous nonporous skin 56. As best seen in FIG. 4, the seal 52 of the present invention has a monolithic body 58 without any lamination. The continuous skin 56 is resistant to penetration by liquids. Thus, the skins seals the seal 52 from penetration by liquids. This prevents liquids such as hydraulic fluid from saturating the closed cell structure 54 and causing the seal 52 to prematurely deteriorate. If the skin 56 does rupture or a liquid otherwise penetrates the skin 56, the closed cell structure 54 provides resistance to saturation by a liquid.

In the preferred embodiment, sharp corners are eliminated from the cross section of the seal 52. Thus, the seal 52 may have a square or rectangular cross section with rounded corners. Likewise, the seal may have a round or elliptical cross section.

When installing the seal 52 into the gland 32 a single length of seal 52 may be used. Once installed, the two ends 62, 72 of the seal 52 will be adjacent to one another. Although not necessary for proper function, further protection to liquid penetration may be provided by adhering the two ends 62, 72 to one another.

The seal 52 of the present invention is manufactured primarily as a molded article from any number of thermoset elastomers, such as natural rubber, polyisoprene, polychloroprene, EPDM, etc. that have a cellular closed cell cross-section 54 with a continuous unbroken outer skin 56. The manufacturing method disclosed herein describes the key process steps which are necessary to produce the preferred embodiment of the seal. To those skilled in the art, it will be recognized that each individual step in the disclosed manufacturing process is well known and understood; however, the novelty of this invention arises from the combination and sequence of these steps which results in the preferred embodiment of the seal.

A mixed and uncured cellular rubber compound is first extruded through a die to produce a specific shape or pre-form. The shape and size of the pre-form is established based upon the desired molded density of the seal as well as the geometry of the pre-form that results in proper heat transfer into the pre-form in the subsequent molding process step to properly decompose the blowing agents within the rubber compound.

After extrusion, the pre-form is placed into a closed mold cavity that provides the final cross-section size and shape desired. The mold cavity is heated using steam, electric heaters, hot oil or any other heating means. Heat is transferred to the uncured rubber pre-form by thermal conduction wherever the rubber comes into contact with the heated mold surfaces. When the blowing agents decompose, gas is released inside the rubber that expands the rubber to fill the mold cavity. The gas pressure causes the rubber to exert pressure between the outer skin of the rubber and the mold cavity. After the rubber is fully expanded, the rubber cures in the mold and assumes the shape of the mold cavity. Prior to installation in the gland 32 of a vacuum pad 22, it can be cut 67 to a length suitable to fit the pad. Various lengths of seal can be manufactured using this method, which produces a seal with a continuous unbroken outer skin, which forms a boundary around the cellular rubber structure on the interior of the seal. Several lengths of seal manufactured using this method can subsequently be vulcanization bonded or spliced together end-to-end.

The fully cured exterior skin is much more resistant to penetration by liquids than the conventional exposed open cell seals previously used. This seal structure minimizes the rate and extent of penetration of liquids that can deteriorate the seal.

In the preferred embodiment for a square or rectangular molded cross-section, the extruded rubber pre-form cross-section is generally circular or elliptical in shape, although, other shapes may be advantageously used to achieve the desired molded cross-section. This approach generally results in a molded seal cross-section without sharp corners on the seal that can catch on the edge of surfaces and tear, thus causing a premature failure.

FIG. 8 shows an embodiment of the seal 52 with an H-shaped cross section with rounded corners. As in the other embodiments, the seal 52 includes a monolithic body 58 having a closed cell structure 54 and a continuous skin 56 that is resistant to penetration by liquids. A top and bottom side 46, 48 of the body 58 are substantially straight. The left and right sides 45, 47 are otherwise straight except for an indentation, recess or valley 49 at about the midpoint of the side 45, 47. The indentation 49 helps ensure seal 52 is properly oriented and placed correctly in the gland 32.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed:

1. A vacuum lifter comprising:
   a rotator configured for attachment to a boom of a piece of construction equipment;
   a pad including a gland extending along a periphery of the pad; and
   a seal located in the gland, the seal comprising:
      a cured natural rubber closed cell thermoset elastomer core structure surrounded by an integral and continuous nonporous external skin, the core structure and the external skin being liquid- and petrochemical-resistant.

2. The vacuum lifter of claim 1, wherein the seal in cross section includes substantially straight top and bottom sides.

3. The vacuum lifter of claim 1, wherein the seal in cross section includes opposing left and right sides, each of the left and right sides including:
   a valley centered at a midpoint of a respective side; and
   substantially straight portions above and below the valley.

4. The vacuum lifter of claim 1, wherein the seal in cross section further includes rounded corners.

5. The vacuum lifter of claim 1, wherein the seal has a memory effect such that it is resistant to permanent compression set.

6. The vacuum lifter of claim 1, wherein the seal is not laminated.

7. The vacuum lifter of claim 1, wherein the seal forms a closed periphery.

8. The vacuum lifter of claim 1, wherein the seal is formed by a process of:
   curing an extruded natural rubber closed cell thermoset elastomer segment in a heated closed mold to form the external skin surrounding the core structure;
   after the curing, cutting a segment of the seal to length.

9. The vacuum lifter of claim 8, wherein the process further includes:
   bonding one end of the segment to another opposite end of the segment to form a closed periphery which can then be received in a gland of a vacuum lifter pad.

10. The vacuum lifter of claim 1, wherein a lifting capacity of the vacuum lifter is in a range of 220 pounds to 960 pounds.

11. The vacuum lifter of claim 1, wherein a lifting capacity of the vacuum lifter is in a range of 960 pounds to 1,700 pounds.

12. The vacuum lifter of claim 1, wherein a lifting capacity of the vacuum lifter is in a range of 1,700 pounds to 3,050 pounds.

13. The vacuum lifter of claim 1, wherein a lifting capacity of the vacuum lifter is in a range of 3,050 pounds to 4,400 pounds.

14. The vacuum lifter of claim 1, wherein a lifting capacity of the vacuum lifter is in a range of 4,400 pounds to 29,750 pounds.

15. The vacuum lifter of claim 1, wherein a lifting capacity of the vacuum lifter is in a range of 29,750 pounds to 55,100 pounds.

16. The vacuum lifter of claim 1, wherein a lifting capacity of the vacuum lifter is in a range of 55,100 pounds to 71,600 pounds.

17. The vacuum lifter of claim 1, wherein a lifting capacity of the vacuum lifter is in a range of 71,600 pounds to 88,100 pounds.

18. The vacuum lifter of claim 1, further comprising the pad configured to engage cylindrical pipe.

19. The vacuum lifter of claim 1, further comprising the pad configured to engage flat pipe.

* * * * *